United States Patent [19]

Cole

[11] 4,430,802
[45] Feb. 14, 1984

[54] VEHICLE WHEEL ALIGNMENT TESTING APPARATUS

[75] Inventor: Thomas O. Cole, Bowling Green, Ky.

[73] Assignee: Daniel T. Rodrigues, Lavergne, Tenn.

[21] Appl. No.: 353,769

[22] Filed: Mar. 1, 1982

[51] Int. Cl.³ .............................................. G01B 7/315
[52] U.S. Cl. ............................. 33/203.12; 33/DIG. 13
[58] Field of Search ........... 33/203.12, 203.13, 203.14, 33/DIG. 13

[56] References Cited

U.S. PATENT DOCUMENTS

| | | | |
|---|---|---|---|
| 2,020,614 | 11/1935 | Miller | 33/203.12 |
| 2,025,051 | 12/1935 | Haucke | 33/203.12 |
| 2,045,108 | 6/1936 | Smith | 33/203.12 |
| 2,087,909 | 7/1937 | Haucke | 33/203.12 |
| 2,499,033 | 2/1950 | Oberholtzer | 33/DIG. 13 |
| 2,676,415 | 4/1954 | Love | 33/203.14 |
| 4,110,913 | 9/1978 | Dick | 33/203.12 |
| 4,167,816 | 9/1979 | Jarman et al. | 33/203.12 |

Primary Examiner—Richard R. Stearns
Attorney, Agent, or Firm—Richard L. Caslin

[57] ABSTRACT

Wheel alignment testing apparatus is shown for use with the wheels of a motor vehicle. This apparatus is adapted for use with the racks of an alignment machine. A remote monitoring console would be provided with gauges for recording the reading of caster, camber, toe and turning radius angles of both front wheels of the vehicle. The apparatus includes two units, one unit for each front wheel. Each unit has a stationary base and a wheel-supporting platform or turntable with front and rear rails for centering the center of the wheel on the vertical turning axis of the turntable. A cross-bar transducer is supported from the turntable, and it is provided with electrical strain gauges at both the front and rear of the wheel for sensing either a positive or negative caster angle, as well as at both the left and right sides of the wheel for sensing either a positive or negative camber angle. In order to measure the toe angle of the wheel, a light transmitter means is mounted on either the base or the turntable, and a cooperating optical receiving means is mounted on the opposite member so that the angular movement of the turntable relative to the base will be sensed and displayed at the remote monitoring console as the toe angle of the wheel. The turning radius of the two front wheels relative to each other may also be measured readily.

7 Claims, 7 Drawing Figures

VEHICLE WHEEL ALIGNMENT TESTING APPARATUS

BACKGROUND OF THE INVENTION

1. Field of the Invention

This invention relates to automotive wheel alignment testing equipment for use in aligning wheels of an automotive vehicle. In particular, this invention relates to a system having electrically-operated gauges which measure angles of caster, camber, turning radius, and toe-in or toe-out of the wheels of a vehicle.

2. Description of the Prior Art

An early patent was issued to Miller U.S. Pat. No. 2,020,614 which describes a wheel alignment system that is mounted on an elevated rack on which swivelled blocks with upstanding walls for receiving the wheels are mounted. These blocks are movable and spring-actuated toward the opposite wall. This apparatus serves to ascertain the alignment of the wheels of the vehicle and camber of each wheel.

The Love U.S. Pat. No. 2,676,415 describes wheel alignment equipment for detecting and indicating the misalignment and the camber of wheels of a vehicle. This equipment is readily portable and it includes a turntable or platform that has sides that will contact the rim of each wheel. The platform moves in response to a side thrust that is exerted by a misaligned wheel through the lowermost point on its rim when the wheel is driven on the top surface of the platform. The amount of shift of the plate or platform is usually indicated on a scale by a pointer that is operatively-connected to the platform.

The Smith U.S. Pat. No. 2,045,108 describes a turning alignment gauge comprising a pair of wheel-supporting elements, and means for indicating the amount of rotational movement of the table with respect to a movable indicator. The table supports substantially parallel rollers which engage the opposite sides of the tire.

The Haucke U.S. Pat. No. 2,167,361 describes a wheel alignment apparatus by means of which all the various alignments of the wheel and the chassis may be checked simultaneously. This apparatus comprises a beam that is rotatably-mounted on the base plate, and a pair of rotatably-mounted cradles are slideably-mounted on the beam. The cradles include means for centering the wheels therein. Means are provided for indicating the amount and direction of rotation of the cradles caused by the insertion of the wheels, as well as means for simultaneously indicating the amount and direction of rotation of the beam.

The Jordan U.S. Pat. No. 3,758,958 describes a wheel-aligning apparatus for selectively measuring camber, caster, and toe conditions, which apparatus includes means adapted to be connected to the side of a wheel, and a measuring circuit including a sensor mounted on said means and including means variably passing current in accordance with the position of the sensor. This Jordan invention provides an electrical circuit including a single sensing device and a single measuring instrument, together with an associated mechanical linkage for measuring the three angles of wheel alignment.

The Dick U.S. Pat. No. 4,110,913 shows an automobile front end alignment equipment comprising a pair of wheel-mounted trucks which are joined together by a parallel bar and are free for universal movement on a horizontal surface, and which support respective carriages for free-swinging about respective axes. These carriages engagingly support the front wheels of a vehicle in a predetermined relation. A bracket is attachable to a wheel whereby correlated toe-in, toe-out, and camber of the wheels may be simultaneously measured. A galvanometer indicates the degree of camber of the wheel.

The Mineck U.S. Pat. No. 2,953,857 describes a wheel alignment testing machine that requires complex machinery for engaging the wheels. This patent utilizes a magnetically-held disk which is applicable, first to a basic test bar and then to the outer face of the wheel hub for checking wheel alignment requiring only the removal of the wheel disk and grease cap of the front wheel hub.

The Darton U.S. Pat. No. 2,261,342 describes wheel alignment equipment built into the floor of a test bay. A pair of plates support the front wheels of a vehicle. These plates are in turn supported on cars which travel on rails or tracks. Rack and pinion mechanisms serve to move the plates, and there are indicating means for measuring the extent of movement of the plates.

The Musselman U.S. Pat. No. 1,950,994 describes a wheel alignment testing machine having a large platform with spaced openings therein, and wheel-supporting plates supported therein for lateral floating movement. These wheel plates are provided with supporting rollers. Each plate has a rack bar which projects into a central housing. Mounted within this housing is a rheostat device comprising a pivoted resistance element carrying member.

The Casler et al. U.S. Pat. No. 1,808,287 describes a wheel alignment gauge comprising a movable platform for supporting the vehicle wheel, an indicator which indicates misalignment of the wheel, and an auxiliary movable member or platform in advance of the platform that is adapted to eliminate tire distortion built up in approaching the device, so that the indicator will indicate the true degree of said misalignment when the platform is traversed by the wheel.

The Jarman et al. U.S. Pat. No. 4,167,816 describes a radius turntable gauge for front end alignment of motor vehicles. There is a supporting frame on which the turntable assembly is suspended by cables. A rod joins the two supporting frames.

The second Dick U.S. Pat. No. 3,457,653 describes wheel alignment equipment having electrically-operated gauges which indicate the camber of the wheels and the degree of toe-in or toe-out of the wheels. There is an upright column that can be attached to a wheel, and an indicator arm is pivotally-connected to the column and it can be adjustably swung to a horizontal position. The swinging of the adjustment arm actuates a potentiometer to cause registry on a galvanometer of a value determined by the degree of camber of the wheel.

OBJECTS OF THE PRESENT INVENTION

The principal object of the present invention is to provide testing apparatus for measuring the wheel alignment of wheels of a motor vehicle from beneath each wheel so that it is unnecessary to connect any testing equipment to the front wheel, axle, or wheel spindle, or any other part of the front suspension system, in order to determine the proper alignment of the front wheels.

A further object of the present invention is to provide testing apparatus of the class described with means for centering each tire in the center of a rotatable turntable that comprises the top portion of the apparatus for each wheel to be tested.

A further object of the present invention is to provide testing apparatus of the class described which is adapted to be mounted on an elevated rack for receiving the wheels of a vehicle thereon, and a remote monitoring unit or console with electrically-operated gauges which will indicate the caster, camber, and toe-in or toe-out of the wheels.

A further object of the present invention is to provide wheel alignment testing apparatus of the class described for measuring both caster and camber by means of strain gauges which are capable of measuring the distribution of weight of the wheel onto the apparatus, while the toe-in or toe-out of the wheel is measured by an optical transmitting unit positioned on the underside of the turntable of the apparatus in cooperation with an optical receiving unit mounted on a fixed base of the apparatus so as to measure the toe of each wheel, thereby obtaining automatic readings of the various angles of the wheels by means of remote electrically-operated gauges.

A further object of the present invention is to provide wheel alignment testing apparatus of the class described, wherein the caster angle may be measured by use of electrical strain gauges fixed to the wheel-supporting platform forwardly and rearwardly of the wheel.

A further object of the present invention is to provide testing apparatus which need not be attached directly to the wheel in order to register the caster, camber and toe angles. The angle readings are made automatically, so the operator can adjust the wheel alignment while observing the alignment angle readings on the remote monitorng console without touching or adjusting the testing apparatus.

A further object of the present invention is to provide testing apparatus with electrical strain gauges fixed to the wheel-supporting platform at both sides of the wheel for measuring the camber angle.

A further object of the present invention is to provide testing apparatus with a base plate having a wheel-supporting turntable, and optical transmitting means mounted on one member and a cooperating optical receiving means mounted on the opposite member for sensing the toe-in of the wheel as a correlation of the turning angle of the turntable, as well as being able to measure the turning radius of the vehicle in both left- and right-hand turns.

SUMMARY OF THE INVENTION

The present invention provides wheel alignment testing apparatus for measuring either the caster or camber angle of a wheel where the apparatus has a stationary base supporting a wheel platform. The platform includes means for centering the wheel on the imaginary center of the platform. The platform includes an elongated bar transducer that has electrical strain-measuring means that are capable of sensing the location of the load point of the wheel relative to a point on the true vertical central transverse plane through the spindle of the wheel to thereby obtain the caster angle of the upper and lower ball joints with respect to true vertical. The elongated bar transducer may include a transverse segment with electrical strain-measuring means for sensing the location of the load point of the wheel relative to a point on the true vertical central longitudinal plane of the wheel so as to determine the camber angle of the wheel. In order to determine the toe angle of the wheel, light transmitter means are mounted on either the stationary base or the turntable, and a cooperating optical receiving means is mounted on the opposite member for determining the toe angle of the wheel as a measure of the amount of turning of the turnable as either an inward or outward angle of the center lines of each wheel with respect to a true parallel center line of both left and right wheels.

BRIEF DESCRIPTION OF THE DRAWINGS

This invention will be better understood from the following description taken in conjunction with the accompanying drawings, and its scope will be pointed out in the appended claims.

DESCRIPTION OF THE PREFERRED EMBODIMENT

Figure 1:
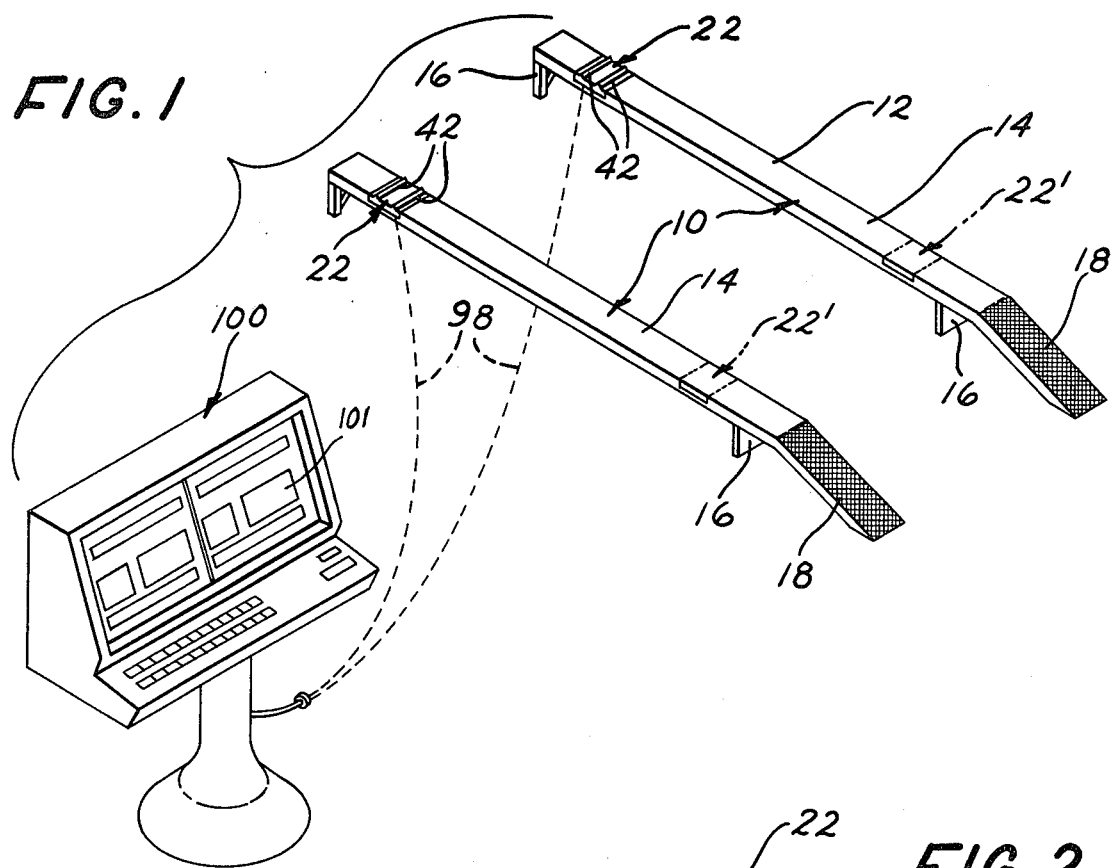
FIG. 1 is a perspective view of the rack of a wheel alignment machine which is fitted with the testing apparatus of the present invention, and which incorporates a remote monitoring console having gauges for displaying the various angles of the wheel, such as caster, camber, toe, as well as turning radius.

Turning now to a consideration of the drawings, and, in particular, to the perspective view of FIG. 1, there is shown the rack or platform 10 of a wheel alignment machine 12. The rack 10 is in the form of a pair of spaced-apart raised tracks or runways 14 supported at a desired elevation by posts 16. Leading from the floor or ground level to the ends of the tracks or runways are ramps 18.

The vehicle wheel alignment testing apparatus of the present invention is identified as element 22, and it is adapted to be recessed into the front end of each track 14 for supporting one of the front wheels of the vehicle thereon. It is recognized that some modern-day vehicles require the alignment of the rear wheels, and therefore apparatus 22' is shown in dotted lines at the rear of the rack for supporting the rear wheels thereon. However, for the purposes of the present invention, the following description will be directed toward the use of this invention for testing the alignment of the front wheels of a motor vehicle.

Figure 2:
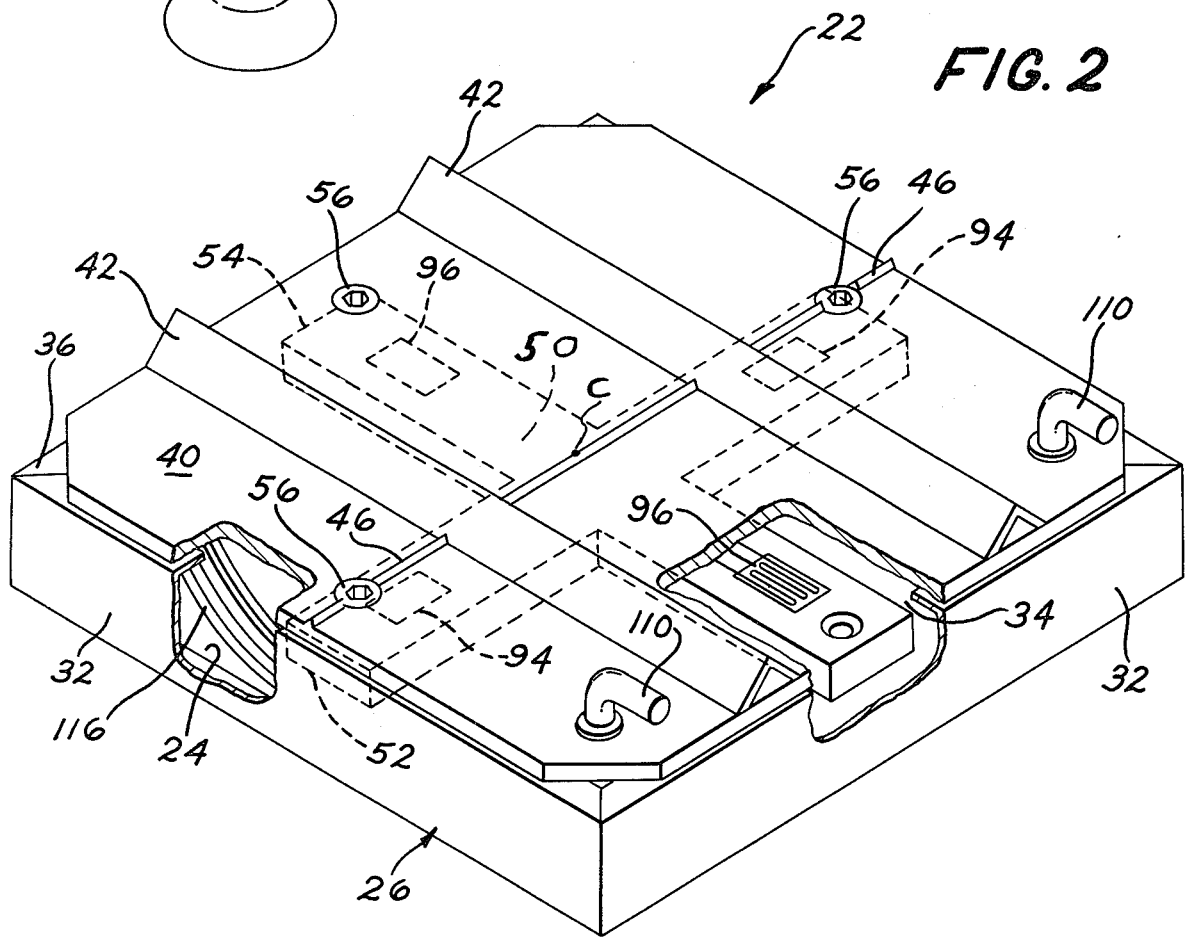
FIG. 2 is a perspective view on an enlarged scale of one of the testing units for the left front wheel of a motor vehicle showing a stationary base that has a wheel-supporting turntable, and means on the turntable for centering the wheel on the imaginary center of the turntable. A cross-bar transducer is shown in dotted lines beneath the turntable.
Figure 3:
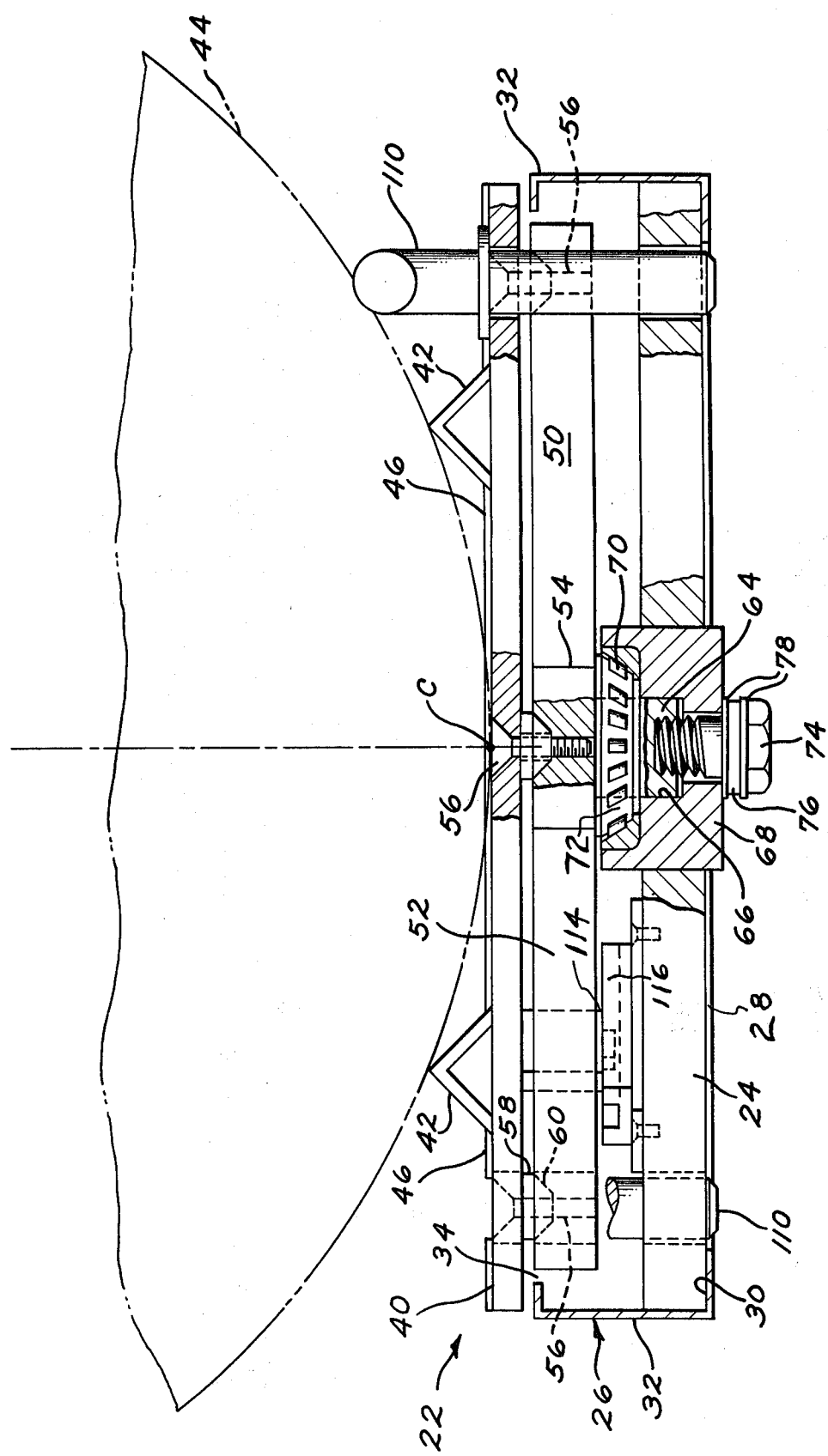
FIG. 3 is a right side elevational view of the testing apparatus of FIG. 2, on an enlarged scale, with some parts broken away and others in cross section, to show the relationship between the stationary base, the top wheel-supporting turntable that carries the cross-bar transducer, as well as the pair of parallel rails for centering the wheel on the turntable, and both the light transmitter means mounted under the turntable and the cooperating optical receiving means mounted on the base for sensing the angle of turning of the turntable to pick up the toe angle of the wheel. The large element at the right side of the view is a releasible locking pin between the turntable and the base for locking the turntable in a neutral or central position.

For a clear understanding of the nature of this testing apparatus 22, attention will now be directed to the top perspective view of FIG. 2, and the right side elevational view in cross section of FIG. 3. This apparatus 22 has a stationary base 24 that is formed by a heavy metal plate that is supported in a generally square or rectangular sheet metal housing 26 that has a generally open bottom wall 28, except for a narrow ledge 30 on which the base plate 24 is supported. The housing 26 has vertical side walls 32 and a generally open top wall 34, except for a narrow folded-over flange 36.

A wheel-supporting platform 40 is supported from the base, and its is provided with a pair of parallel inverted V-rails 42 which extend transversely of the platform 40, as well as transversely of the raised tracks 14, as is best seen in FIG. 1. As best seen in FIG. 3, these V-rails 42 serve to center the vehicle wheel 44 at the imaginary center C of the platform 40. It is also well to center the wheel 44 on a longitudinal center line of the platform. This longitudinal center line is represented by a centering guide ridge 46 of slight dimensions that is adapted to be sighted by the operator to be in line with a central longitudinal bead (not shown) of the tire tread at the bottom portion of the tire.

Positioned beneath the wheel-supporting platform 40 is a cross-bar transducer 50 of hardened metal that is shown in dotted lines in FIG. 2, and partially in cross section in FIG. 3. This cross-bar transducer has an elongated longitudinal bar 52 and an elongated transverse bar 54, where these bars are joined together near their midpoint so that the midpoint of the cross-bar transducer coincides with the imaginary center C of the platform 40. Four mounting bolts 56 are used for joining the wheel-supporting platform 40 to the cross-bar transducer 50. There is a mounting bolt 56 located adjacent the free end of each of the cross-bar transducer, as is best seen in FIGS. 2 and 3. Spacers, in the form of centering bushings 58, are positioned in a countersunk hole 60, and these spacers serve to separate the cross-bar transducer from the underside of the platform 40, as is best seen in FIG. 3. The underside of the central portion of the cross-bar transducer 50 is provided with a stub shaft 64 which fits into a mating hole 66 in a mounting block 68 that is fitted to the base plate 24, as is best seen in FIG. 3. This mounting block includes a tapered bearing race 70 for receiving a tapered bearing 72 that is fitted onto the shaft 64 so that the wheel-supporting platform 40 is actually a turntable that has a central vertical turning axis that coincides with the imaginary center C of the platform. A locking bolt 74 is located through the underside of the mounting block 68 and is threaded into the lower end of the stub shaft 64. This locking bolt 74 does not immobilize the shaft 64, but merely prevents the shaft 64 from separation from the mounting block 68. This locking bolt 74 is fitted with a linear bearing 76 that is sandwiched between a pair of washers 78 so that the locking bolt 74 is capable of turning with the turntable 40.

Next to be discussed are the four basic angles of wheel alignment; namely, caster, camber, toe and turning radius. There is one other angle; namely, steering axis inclination, but this angle is not widely known and is frequently ignored by most people working in the wheel alignment field.

Figure 4:
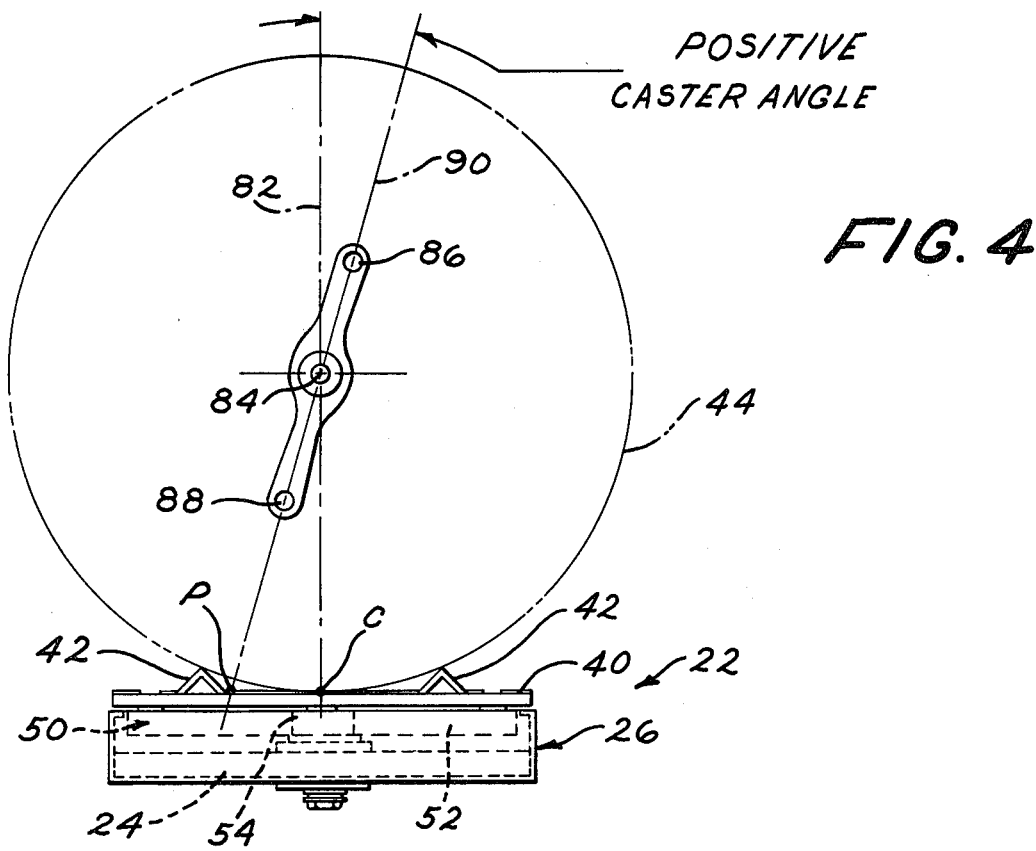
FIG. 4 is a right side elevational view similar to that of FIG. 3, on a smaller scale, with the left-hand front wheel supported on the unit to illustrate the caster angle of that wheel as the angle between the upper and lower ball joints with respect to the true vertical line that is drawn through the spindle of the wheel.

Turning to a consideration of FIG. 4 of the drawings, the definition of caster is the backward or forward tilt of the king pin or ball joints as measured from a true vertical position. The caster angle is not a tire-wearing angle. Caster has to do with the stability as the vehicle moves down the road. This caster angle is designed into the vehicle from a true vertical position that is taken through the spindle of the wheel. If the ball joints or king pin is tilted forward at the top, it is known as negative caster. These caster settings are either positive or negative, and they are set to a car manufacturer's specifications. Some cars have a positive caster and others run with a negative caster.

Looking at FIG. 4, the wheel 44 is centered over the imaginary center C of the turntable 40. Thus, a vertical line 82 drawn through the spindle 84 of the wheel will coincide with this imaginary center C. The upper ball joint is identified as element 86, and the lower ball joint as element 88. If a line 90 is drawn through the center line of each ball joint 86 and 88, the angle between this line 90 and the vertical line 82, as measured at the top of the wheel 44, is considered as a positive caster angle. If this line 90 were continued down until it reaches the turntable 40, the point of intersection P is called the "load point." This load point may be defined as the theoretical point where the load of the wheel 44 is located with respect to its supporting surface. The position of this load point P is directly related or capable of correlation to the caster angle. Thus, it is possible to measure to caster angle by locating the load point P.

The testing apparatus 22 of the present invention is capable of locating the load point P by means of the cross-bar transducer 50, as will now be explained with relation to FIG. 2. An electrical strain gauge 94 is bonded to the top surface of the elongated longitudinal bar 52, across the stress area at the front and rear of the wheel axis, for measuring the load point P and determining the caster angle, while similar electrical strain gauges 96 are bonded to the top surface of the elongated transverse bar 54, across the stress area at the left and right sides of the wheel axis, for measuring the load point P' for determining the camber angle, as will be explained later with regard to FIG. 5. It should be understood by those skilled in this art that the strain gauges 94 and 96 must be attached to the top surface of the transducer 50, but that the precise location on each of the four arms or cross-bars may vary. Flexible lead wires (not shown) will connect with the strain gauges 94 and 96, and will join into a cable 98 that leads from the wheel alignment machine 12 to a remote monitoring console 100, as is best seen in FIG. 1. This console will comprise a wheel alignment computer for providing electronic wheel alignment with either analog, digital or Go-No Go displays or gauges 101 for both front wheels simultaneously. Thus, during the wheel alignment adjustments, the mechanic can refer to the monitoring console for learning when the proper adjustment has been reached and the wheel alignment procedure accomplished. The electrical strain gauges 94 and 96 will receive a controlled voltage and will show a variable resistance, depending upon the flexing of the cross-bar transducer.

Figure 5:
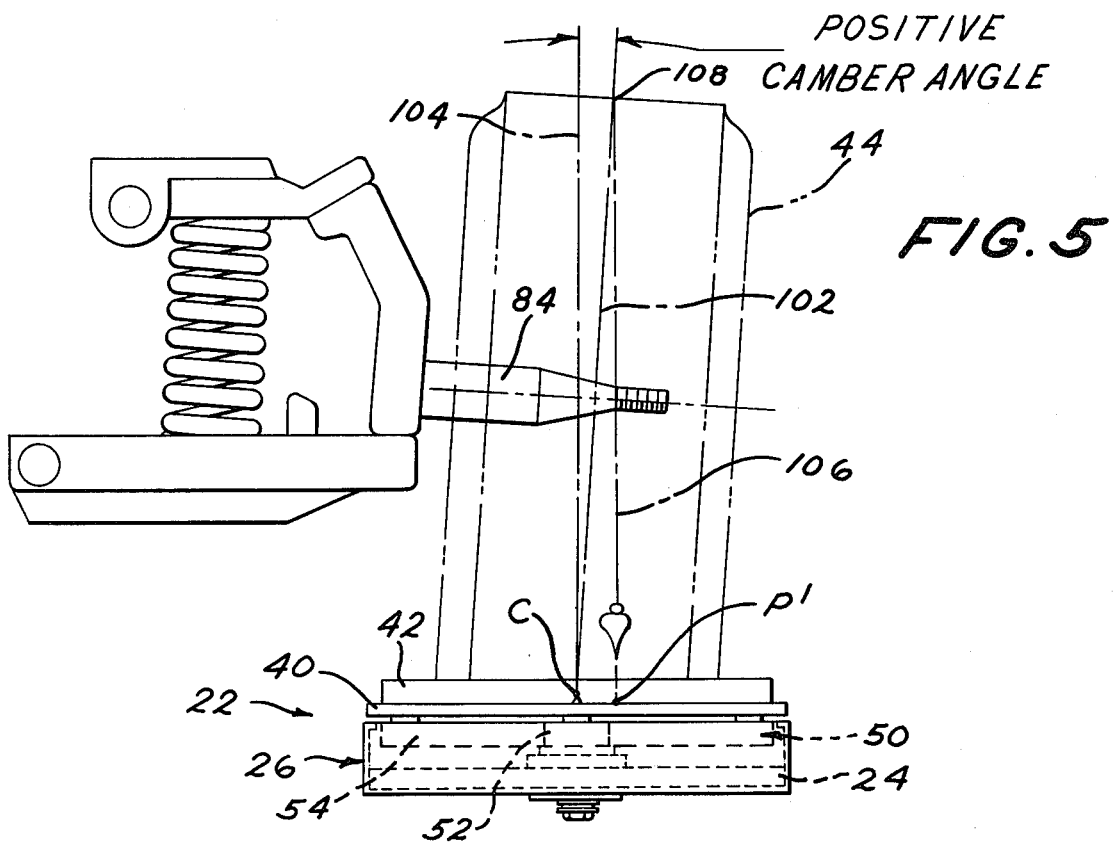
FIG. 5 is a front elevational view of the testing unit shown in FIG. 4, which is taken from the left side of FIG. 4 and showing the left front wheel positioned on the unit, and a fragment of the suspension system of the vehicle. This illustrates the camber angle of the wheel, which is measured as the angle formed by either the inward or outward tilt at the top of the wheel as determined by the load point of the wheel relative to a point on the true vertical central transverse plane of the wheel. Positive camber is known as the outward tilt of the wheel at the top.

Turning now to a consideration of FIG. 5 of the drawings, this view is a front elevational view of the testing apparatus 22 for use with the left front wheel 44. The definition of camber is the inward or outward tilt of the top of the wheel as measured from a central vertical plane. The purpose of the camber angle is to position the tire of the wheel on the road so as to obtain proper tire wear, in view of the fact that most roads are crowned so as to allow water to drain to the sides of the road. A negative camber would be the inward tilt of the wheel at the top, measured from a true vertical plane, and it would never be satisfactory to have a wheel with a negative camber angle as the car rides down the road. The wheel spindle 84 is shown slightly inclined downwardly. A perpendicular line 102, as measured from the imaginary center C of the platform 40 to be perpendicular to the spindle 84, will form the camber angle with respect to a true vertical longitudinal plane 104 drawn from the imaginary center C. If a vertical line 106 were dropped down from the point 108 at the center of the top of the wheel until it reached the wheel-supporting surface of the turntable 40, this point of intersection P' would be considered the load point, and it would be proportional or correlated to the positive camber angle as measured at the top of the wheel. This load point P' may be defined as the theoretical point where the load of the wheel 44 is located with respect to its supporting surface 40. The two electrical strain gauges 96, 96 mounted on the top surface of the elongated transverse bar 54 would sense the location of this load point P' as a measure of the positive camber angle, and it would be displayed on the remote monitoring console 100.

It should be appreciated by those skilled in this art that the wheel-supporting platform 40 need not have the ability to turn if the testing apparatus 22 were merely used to measure caster, as is depicted in FIG. 4. Nor would the platform 40 have to have the ability to turn if it were merely used to measure camber, as is depicted in FIG. 5. The main reason for constructing the wheel-supporting platform 40 as a turntable was to expand the capability of the apparatus for measuring both toe and turning radius in addition to caster and camber. It is important to provide the turntable 40 with one or more releasable locking pins 110 between the turntable 40 and base plate 24 in order to be able to hold the turntable in a central locked position both for calibration purposes of the gauges in the remote monitoring console 100, as well as to protect the testing apparatus 22 from damage while the vehicle (not shown) is being driven onto and off the testing apparatus.

Figure 6:
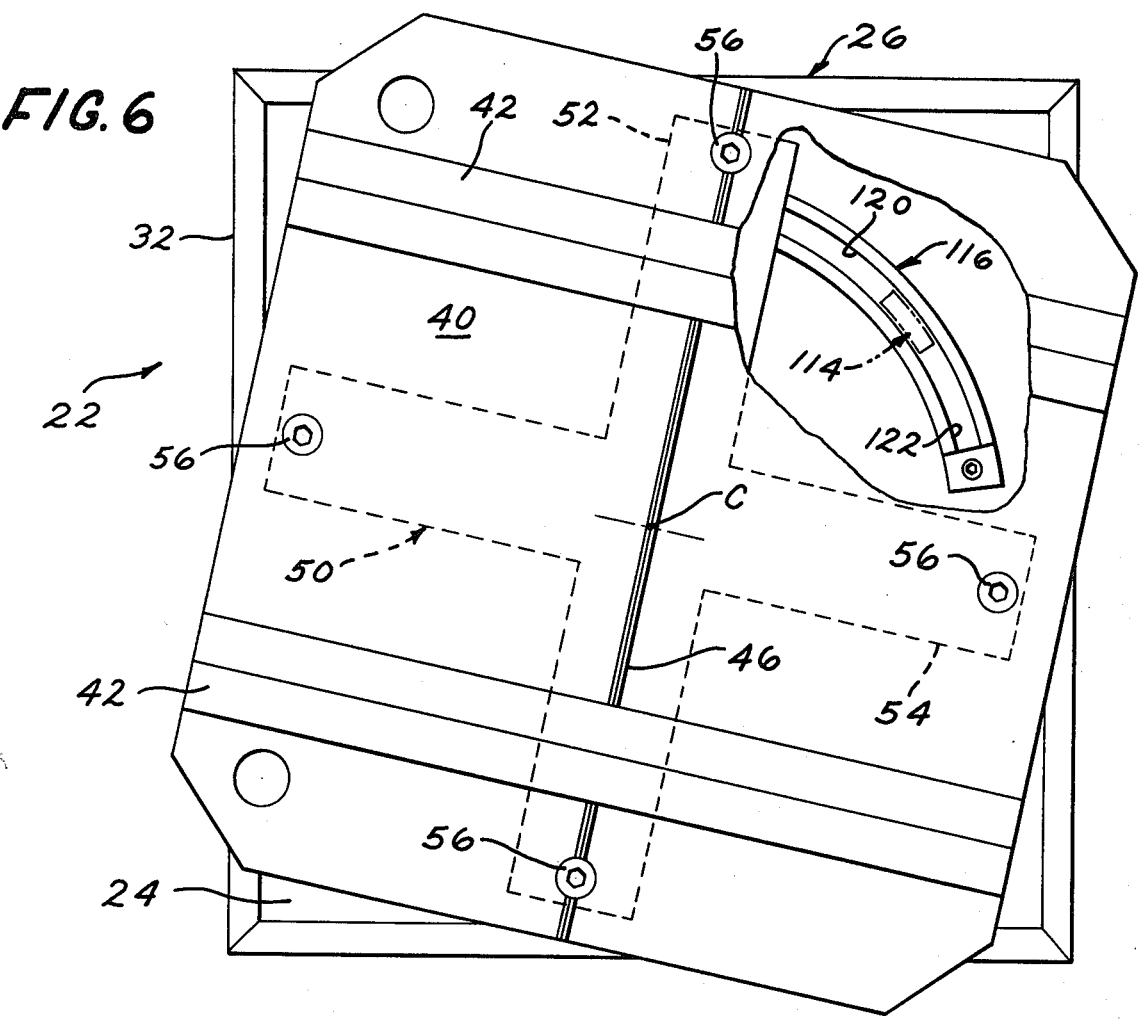
FIG. 6 is a top plan view of the testing apparatus of both FIGS. 2 and 3 showing the turntable moved in a clockwise direction with a part broken away in the top right-hand quarter of the turntable to expose the optical receiving member that is mounted on the base with the light-transmitting unit that is suspended from the underside of the turntable for movement within the receiving means for indicating the toe angle of the wheel.
Figure 7:
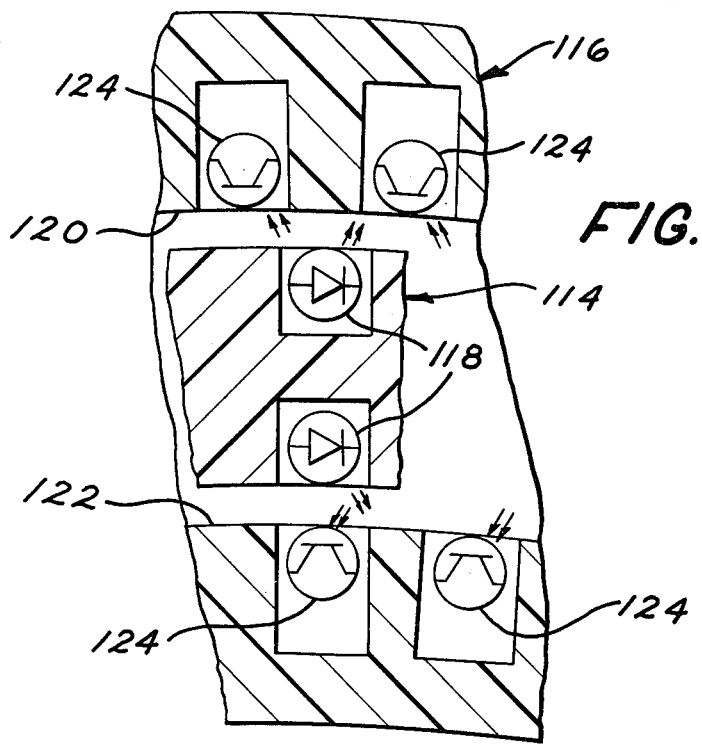
FIG. 7 is a fragmentary diagrammatic view of the movable optical transmitter with its two light-emitting diodes interacting with the optical receiver with its two opposing banks of phototransistors for measuring the toe angle and turning radius.

Attention is directed to the top plan view of FIG. 6 where the turntable 40 is shown as having been turned clockwise through an angle of about 15 degrees. Toe-in is the amount of difference of distance between the front of the front wheels and the rear of the front wheels, measured either in inches, centimeters, or in degrees, depending upon the instrument doing the measuring. The toe angle is the inward or outward angle of the center line of each wheel with respect to a true parallel center line of both left and right wheels. In FIG. 6, as an example, this testing apparatus 22 is adapted for supporting the left front wheel. Although the wheel is not shown on the turntable 40, the average left wheel has a toe-in which causes the turntable 40 to move clockwise from a center position, and it is necessary to measure this toe-in angle. Electrical strain gauges 94 and 96 were described earlier for measuring the caster and camber angles. The present invention uses optical transmitter and receiver means which are capable of sensing this toe angle. An optical transmitter 114 is mounted on either the turntable 40 or the base plate 24, and an optical receiver means 116 is mounted on the opposite member for cooperation with the transmitter for sending a signal to the remote monitoring console that will display the actual angle that has been assumed by the turntable after the turntable is unlocked from the base plate by removing the releasible locking pins 110.

In the preferred embodiment, the optical transmitter 114 is suspended from the underside of the turntable 40, while the optical receiver means 116 is mounted on the top surface of the base plate 24. The optical transmitter 114 is in the form of a block having a pair of light-emitting diodes 118, with each diode facing in opposite directions from the two sides of the member. The receiver means 116 is in the form of an arcuate, channel-like member, in plan view, with a curved pair of spaced parallel side walls or concentric side walls 120 and 122 for receiving the transmitter block 114 for movement therebetween. Each side wall 120 and 122 is furnished with a plurality of inwardly-directed, light-sensing phototransistors 124. The arcuate optical receiver 116 traverses an angle of plus or minus 30 degrees measured from a central, neutral position, and the light-sensing phototransistors 124 on one side wall 120 are out of alignment with the same units on the opposite side wall 122. For example, the centermost phototransistor 124 may be considered as the datum point or zero reading, and the adjacent units are mounted every two degrees, while on the opposite side wall 120, the phototransistors 124 are positioned at odd angles, starting at 1 degree, 3 degrees, 5 degrees, etc., so that this combination of light-emitting diodes 118 and light-sensing phototransistors 124 are capable of breaking down the angular reading to graduations of 1/64th of an inch. Again, the displays 101 at the console 100 can be either analog, digital or Go-No Go lights.

The definition of turning radius is the amount that the front wheels toe-out on a turn. When a vehicle makes a turn, the inside wheel of the turning front wheels is in an assumed toed-out position, which means that the inside wheel is turning quicker than the outside wheel; thereby, allowing the inner wheel to turn without sliding. If the inside wheel did not turn quicker than the outside wheel, the inside wheel would have to slide, which would cause rapid tire wear.

Having described above my invention of a novel wheel alignment testing apparatus, it will readily be apparent to those skilled in this art that the prior art mounted the testing apparatus to the wheel spindle or the wheel itself, while in the present invention, it is possible to have apparatus to measure these various angles from beneath the wheel itself. Inasmuch as caster and camber are nothing more than a distribution of weight of the vehicle, it is believed that this measuring operation can be done by using electrical strain gauges 94 and 96. The thing that makes this possible is that the wheel is first centered on the imaginary center C of the platform or turntable 40. In order to obtain this centering action, the vehicle is driven up onto the rack 10 until it's supported by the raised tracks or runways 14. The two front wheels are positioned on the testing apparatus 22, as seen in FIG. 1. The wheel would be centered by the pair of parallel V-rails 42. At this early time, the remote monitoring console 100 would be in an OFF position. First, the front end of the vehicle is jacked up, and the front suspension is checked for looseness. This is a procedure that is accepted throughout the industry. One wheel is jacked up at a time to make sure that everything is tight so that the alignment can be initiated. As the jack is lowered, the testing apparatus 22 is sighted under the wheel along the centering guide ridge 46 so that it is in alignment with the center bead of the tire, and when that alignment takes place, then the jack is completely lowered and the wheel is centered both longitudinally and transversely with respect to the imaginary center C of the apparatus 22. At this point, it is possible to pull the releasable locking members 110, and it would be possible to automatically read the caster, camber, and toe angles at the same time for both the left and the right wheels.

In order to measure the turning radius, the wheels would be turned until the right toe meter would read, for example, 20 degrees on the scale of the console. Then the operator would look at the display for the left toe meter, and it should read between 22 and 25 degrees since these are the tolerances that are acceptable on turning radius in the alignment industry. In order to obtain the reading for the opposite wheel, this procedure is reversed.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A vehicle wheel alignment testing apparatus for selectively measuring the caster angle of the wheel, said apparatus comprising:
   a. a stationary base;
   b. a wheel platform supported on the base, and means on the platform for centering the center of the wheel substantially on the imaginary center of the platform;
   c. the platform including an elongated bar transducer located substantially within the vertical central longitudinal plane of the wheel and having electrical strain-measuring means forward and rearward of the wheel axis for sensing the location of the load point of the wheel relative to a point on the true vertical central transverse plane of the wheel; and a remote monitoring means with electrical circuit means joining the electrical strain-measuring means for displaying the caster angle by the monitoring means.

2. The invention as recited in claim 1, wherein the said apparatus is also capable of measuring the camber angle of the wheel, the said elongated bar transducer also having a transverse elongated bar that is centered thereon with left-hand and right-hand electrical strain-measuring means carried thereby at the opposite sides of the wheel for sensing the location of the load point of the wheel relative to a point on the true vertical central longitudinal plane of the wheel, while the said remote monitoring means is likewise electrically-connected to the side mounted strain-measuring means for displaying the camber angle by the monitoring means.

3. The invention as recited in claim 1, wherein the said bar transducer comprises a pair of generally right-angular cross-bars that are joined together substantially adjacent their centers, said centers coinciding with the said imaginary center of the platform with a first longitudinal bar located in the longitudinal center plane of the wheel for measuring the caster angle, and a second transverse bar having electrical strain-measuring means on the top surface thereof adjacent the stress points of this bar for sensing the location of the load point of the wheel relative to the imaginary center of the platform for measuring the camber angle of the wheel when the strain-measuring means are connected to the said remote monitoring means.

4. The invention as recited in either claims 1, 2, or 3, wherein the said bar transducer is provided with spacers on the top side thereof adjacent the ends of the bar, and mounting means on the said platform extending through the spacers and into the bar transducer for holding these elements assembled together, the said electrical strain-measuring means being strain gauges bonded to the top surface of the bar transducer.

5. The invention as recited in either claims 1, 2, or 3, wherein the said wheel platform is a turntable, and the imaginary center of the platform is the vertical turning axis of the turntable, a light transmitter means mounted on either the stationary base or the said turntable, and a cooperating optical receiving means mounted on the other member, whereby the movement of the turntable relative to the stationary base will be sensed by the optical receiving means, and electrical circuit means joining the said light transmitter means and optical receiving means to the said remote monitoring means for displaying the toe angle of the wheel by the monitoring means, and releasable locking means between the turntable and the base member to hold the turntable in a central locked position, both for calibration purposes and the protection of the apparatus from damage during the movement of a wheel on and off the apparatus.

6. The invention as recited in either claims 1, 2, or 3, wherein the said wheel platform is a turntable, and the imaginary center of the platform is the vertical turning axis of the turntable, light-emitting diode transmitter means carried by the movable turntable for cooperation with a plurality of light-sensing phototransistor receiver means mounted on the base member, the receiver means being formed as an arcuate member with a curved pair of spaced concentric side walls, each side wall supporting a plurality of inwardly-directed light-sensing phototransistors which are slightly offset from the similar units on the opposing side wall, the said transmitter means being interposed for movement between the spaced side walls of the receiver means and provided with a light-emitting diode on two opposing side walls of the transmitter means for cooperation with the said plurality of phototransistors for measuring the toe angle of the wheel.

7. A vehicle wheel alignment testing apparatus for selectively measuring the caster, camber, and toe angles, as well as the turning radius of the two front wheels of a vehicle, said apparatus comprising:
   a. a pair of wheel-supporting units;
   b. each unit comprising a stationary base with a wheel-supporting turntable supported therefrom, and means for centering the center of the wheel substantially on the vertical turning axis of the turntable;
   c. each turntable including a cross-bar transducer having a pair of generally right-angular bars that are joined substantially adjacent their midpoints, one bar being located substantially within the vertical central longitudinal plane of the wheel, while the other bar is located substantially in the vertical central transverse plane of the wheel;
   d. and an electrical strain gauge bonded to the top surface of the said cross-bar transducer adjacent each area of stress in each arm of the cross-bar;
   e. and a remote monitoring means with electrical circuit means joined with the strain gauges for indicating the caster and camber angles of each wheel being tested;
   f. and locking means for holding the turntable in a locked neutral position, both for calibration purposes and the protection of the apparatus from physical damage;
   g. and light-emitting diode transmitter means mounted on either the stationary base or the turntable, and a plurality of cooperating light-sensing phototransistor receiver means mounted on the other member so that when the turntable is unlocked, the turntable will assume an offset angle correlated to the toe angle of the wheel;
   h. the said remote monitoring means also having electrical circuit means joined to the said light transmitter means and receiver means for displaying the toe angle of the wheel as well as being capable of indicating the turning radius of the wheel relative to the opposite wheel.

* * * * *